United States Patent
Yagasaki et al.

(10) Patent No.: US 7,951,032 B2
(45) Date of Patent: May 31, 2011

(54) BELT TYPE NON-STAGE TRANSMISSION AND OPERATING METHOD THEREOF

(75) Inventors: Toru Yagasaki, Wako (JP); Ryuhei Kataoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 475 days.

(21) Appl. No.: 12/066,801

(22) PCT Filed: Sep. 29, 2006

(86) PCT No.: PCT/JP2006/319474
§ 371 (c)(1),
(2), (4) Date: Mar. 13, 2008

(87) PCT Pub. No.: WO2007/037371
PCT Pub. Date: Apr. 5, 2007

(65) Prior Publication Data
US 2009/0181814 A1 Jul. 16, 2009

(30) Foreign Application Priority Data
Sep. 30, 2005 (WO) .................. PCT/JP2005/018115

(51) Int. Cl.
*F16G 1/21* (2006.01)

(52) U.S. Cl. ........................ 474/242; 474/260

(58) Field of Classification Search .......... 474/242–245, 474/248–249, 260
See application file for complete search history.

(56) References Cited

U.S. PATENT DOCUMENTS

| | | | |
|---|---|---|---|
| 5,456,639 A * | 10/1995 | Herbert et al. | 474/237 |
| 6,440,024 B1 * | 8/2002 | Kobayashi | 474/242 |
| 6,537,166 B1 * | 3/2003 | Adriaenssens et al. | 474/8 |
| 6,599,212 B2 * | 7/2003 | Kanokogi et al. | 474/242 |
| 6,893,370 B2 * | 5/2005 | Kobayashi | 474/242 |
| 2004/0176202 A1 | 9/2004 | Sakai | |

FOREIGN PATENT DOCUMENTS

| | | |
|---|---|---|
| EP | 1 455 114 B1 | 8/2004 |
| GB | 1 234 192 A | 6/1971 |
| JP | 07-070761 A | 3/1995 |
| JP | 2001-065651 A | 3/2001 |
| JP | 2004-144110 A | 5/2004 |
| WO | 2004/108990 A1 | 12/2004 |

* cited by examiner

*Primary Examiner* — Sang Kim
(74) *Attorney, Agent, or Firm* — Arent Fox, LLP

(57) ABSTRACT

A belt type non-stage transmission is constituted so that a V belt obtained by connecting a plurality of elements using a belt is wound around a pair of pulleys which have a groove with V-shaped cross section and which groove width can be changed. A diffusion layer where at least one of Zn and Sn diffuses on a surface layer of a metallic material of the pulleys and the elements is provided to at least one of contacting surfaces between the pulleys and the elements. The diffusion layer contains S and P. As a result, high frictional coefficient and wear resistance can be maintained for a long time, so that the device can cope with heightening of output.

11 Claims, 8 Drawing Sheets

BELT TYPE NON-STAGE TRANSMISSION AND OPERATING METHOD THEREOF

CROSS-REFERENCE TO RELATED APPLICATION

This application is a National Stage entry of International Application No. PCT/JP2006/319474, filed Sep. 29, 2006, the entire specification claims and drawings of which are incorporated herewith by reference.

TECHNICAL FIELD

The present invention relates to a belt type non-stage transmission, and particularly relates to a technique which heightens a frictional coefficient between a pulley and a V belt so as to improve power transmission efficiency and reduce wear of the pulley and the V belt.

BACKGROUND ART

In recent years, according to heightening of output from engines of automobiles, belt type non-stage transmissions should cope with such requirements. The belt type non-stage transmission is constituted so that a V belt, obtained by connecting a plurality of elements by a belt, is wound around a pair of pulleys which have a groove with a V-shaped cross section and in which the width of the groove can be changed. The belt type non-stage transmission transmits a motive power from a driving pulley to a driven pulley due to a frictional force between the pulleys and the elements. According to the heightening of output in recent years, a clamping force between the pulleys and the elements increases. As a result, wear is generated on contacting surfaces between the pulleys and the elements, and the frictional coefficient therebetween reduces so that traveling performance is possibly deteriorated. For this reason, conventionally, the frictional coefficient on the contacting surfaces between the pulleys and the elements has been heightened, so that the clamping force is reduced, in order to cope with the heightening of output. Further, the frictional coefficient between the pulleys and the elements should be heightened, and wear should be reduced. In order to satisfy both of them, there has been conventionally various developments.

For example, Japanese Patent Application Laid-Open No. 2001-65651 discloses a belt type non-stage transmission in which a portion on a low side of speed ratio, to which transmit a strong motive power of the pulleys, is subject to shot peening so that the frictional coefficient is increased and the wear resistance is improved. It is also disclosed that except for the shot peening, WPC process, plating, coating, grinding and heat treatment may be performed.

Japanese Patent Application Laid-Open No. 2004-144110 discloses a belt type non-stage transmission in which contacting surfaces between the elements and the pulleys are coated with resin containing self-lubricating agent such as graphite, molybdenum disulfide so that the frictional coefficient is heightened and wear resistance is improved.

In the technique exemplified in Japanese Patent Application Laid-Open No. 2001-65651, however, the frictional coefficient and the wear resistance are improved due to a change in surface property caused by shot peening or the like, but its effect turns out to greatly depend on the performance of additive agent in the lubricant. In the above technique, therefore, when the lubricant is deteriorated due to long-time running, a desired performance cannot be obtained, and thus this is insufficient as the improvement of the belt type non-stage transmission. The improvement using the coating disclosed in Japanese Patent Application Laid-Open No. 2001-65651 has a disadvantage that when a film thickness is decreased, the film wears out early, and when the thickness is increased, it is easily peeled off.

A groove with depth of about 40 μm for retaining the lubricant is formed on the contacting surfaces between the pulleys and the elements, but since the contacting surfaces between the elements and pulleys are coated with resin in the technique in Japanese Patent Application Laid-Open No. 2004-144110, it is difficult to accurately fabricate such fine grooves on the resin. For this reason, the retention of the lubricant in the groove becomes insufficient, and a reaction film with the lubricant component is not formed on the contacting surface of the elements, thereby possibly causing seizing. Since heat expansion coefficients are different between the elements and the resin, there is a fear that the resin is peeled off. Further, since the elements are used in the lubricant, there is a fear that the resin is deteriorated and cured due to the lubricant component. The technique of the Japanese Patent Application Laid-Open No. 2004-144110 lacks reliability, which is a serious problem.

DISCLOSURE OF THE INVENTION

It is an object of the present invention to provide a belt type non-stage transmission which can maintain high frictional coefficient and wear resistance for a long time and can sufficiently cope with high output, and an operating method thereof.

The inventors of the present invention did research on coating for providing high frictional coefficient and wear resistance to elements and pulleys. As a result, they considered that it is impossible to exceed the above conventional technique by coating the surfaces, and gave thought to application of a discharge surface treatment. The discharge surface treatment is a surface treatment method of causing discharge between an electrode and metal to be treated and diffusing the metal of the electrode on the surface layer of the treated metal. With this method, a layer (or a compound layer) where the treated metal and the electrode metal are mixed is formed (for example, WO2004-108990). The inventors examined various metals as the electrode, and found that Zn had the best performance. They further advanced the examination, and found a required performance was obtained when lubricant containing P and S was used. The inventors did a search on the elements and the pulleys used in the experiment, and found that a diffusion layer where Zn diffused contained S and P. Due to this diffusion layer, the high frictional coefficient and wear resistance are given. Furthermore, the inventors have found that similar effect is obtained in a case of Sn.

A belt-type non-stage transmission of the present invention is formed based on the above findings. The present invention provides a belt type non-stage transmission comprising: a pair of pulleys having a groove with V-shaped cross section, the groove being able to change it's width; a V belt manufactured by connecting a plurality of elements via a belt and wound around the pair of pulleys; and a diffusion layer formed on at least one of contacting surfaces between the pulley and the element; wherein the diffusion layer is formed by diffusing at least one of Zn and Sn into a surface layer of a metallic material of the pulley and/or the element, and contains S and P.

In order to allow the diffusion layer to contain S and P, the pulleys and the elements may be brought into contact with a liquid containing S and P. In the easiest method, lubricant containing S and P is used to run in the belt-type non-stage transmission. The present invention also provides such an operating method for operating a belt type non-stage transmission comprising: a pair of pulleys having a groove with V-shaped cross section, the groove being able to change it's width; a V belt manufactured by connecting a plurality of elements via a belt and wound around the pair of pulleys; and a diffusion layer formed on at least one of contacting surfaces between the pulley and the element, the diffusion layer being formed by diffusing at least one of Zn and Sn into a surface layer of a metallic material of the pulley and/or the element; the method comprising: operating the belt type non-stage transmission while contacting a lubricant containing 0.06 to 0.30% by weight of S and 100 to 600 ppm of P.

According to the belt type non-stage transmission of the present invention, the diffusion layer can provide high frictional coefficient and wear resistance to the elements and the pulley. A thickness of the diffusion layer is set suitably so that wear of the diffusion layer can be prevented, and even if the thickness is enlarged, there is no fear of peeling of the diffusion layer. Therefore, the high frictional coefficient and wear resistance can be maintained for a long time. When the diffusion layer is formed on the elements, after the diffusion layer is formed, fine grooves for maintaining lubricant can be formed by machine work. According to the method of operating the belt type non-stage transmission of the present invention, since S and P in the lubricant are in an extreme-pressure state between the elements and the pulleys, these elements easily permeate through the diffusion layer, so that the belt type non-stage transmission of the present invention can be manufactured.

REFERENCE NUMERALS

Figure 1:
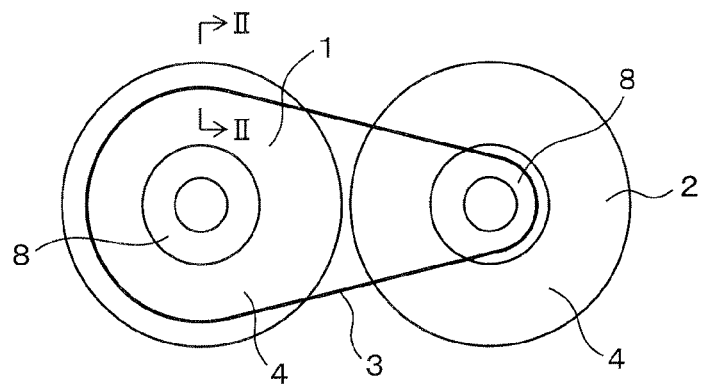
FIG. 1 is a side cross sectional view illustrating a belt type non-stage transmission according to an embodiment of the present invention.

1 denotes a driving pulley, 2 denotes a driven pulley, 3 denotes a V belt, 4 denotes discs, 5 denotes a metal ring collective (belt), 6 denotes elements, and 8 denotes a diffusion layer.

BEST MODE FOR CARRYING OUT THE INVENTION

Preferred embodiments of the present invention are explained below.

Zn and Sn are components which give high frictional coefficient and wear resistance. It is desirable that the content of Zn in a diffusion layer is 0.5% or more by weight, and the content of Sn in the diffusion layer is 0.5% or more by weight in order to securely obtain the function and effect of the present invention. In is desirable that the content of S is 0.4% or more by weight and the content of P is 0.15% or more by weight. When the content of Zn in the diffusion layer exceeds 15% by weight, the frictional coefficient reduces on the contrary. When the content of Sn in the diffusion layer is not more than 18.5% by weight, the frictional coefficient does not decrease. S and P give high frictional coefficient and wear resistance to the diffusion layer, and also prevent oxidation of lubricant.

It is preferable that the diffusion layer contains 0.15 to 0.4% by weight of Ca which further improves the function and effect of S and P. In this case, mineral oil as a basic oil of lubricant contains 300 to 660 ppm of one or two or more kinds from Ca sulfonate, Ca salicylate, and Ca phenate. By containing Ca in the lubricant, the important function and effect such that S and P easily permeate through the diffusion layer along with Ca, can be obtained. That is to say, at the time of running-in, high frictional coefficient and wear resistance are not given until S and P permeate through the diffusion layer, and thus elements and pulleys possibly worn away during this time. It is, therefore, necessary that S and P permeate through the diffusion layer as quickly as possible, and Ca produces such a function and effect.

It is preferable that the diffusion layer contains 0.1 to 0.4% by weight of Mg which has the equivalent effect to that of Ca. In this case, 200 to 260 ppm of Mg as cleaning agent can be added to lubricant. Further, it is preferable that the diffusion layer contains the following elements.

N: the lubricant contains 0.10 to 0.30% by weight of N as viscosity modifier and cleaning agent.

Zn: in order to adjust the content of Zn in the diffusion layer, the lubricant can contain 150 to 400 ppm of Zn.

B: the lubricant contains 100 to 350 ppm of B as disperser.

In order to securely attain the function and effect of the present invention for a long time, the thickness of the diffusion layer is desirably 0.5 μm or more. Providing the diffusion layer which thickness exceeds 50 μm would be over abundance of performance, and the production cost is comparatively high. When a general serviceable life (travel distance) of an automobile is taken into consideration, the thickness of the diffusion layer of 5 or less Am is sufficient.

It is more preferable that the diffusion layer contains at least one kind selected from a group consisting of Ni, Cr, Mo, Al and C so that its total weight is 1 to 20% by weight. These elements further heighten the frictional coefficient. In order to obtain such a function and effect, it is necessary that the diffusion layer contains 1% or more by weight of the above elements, and if the content exceeds 20% by weight, higher function and effect would not be obtained. With a discharge surface treatment by using a compound of the above element and at least one of Zn and Sn as an electrode, the diffusion layer can contain the above elements.

1. Constitution of Belt type Non-Stage Transmission

Figure 2:
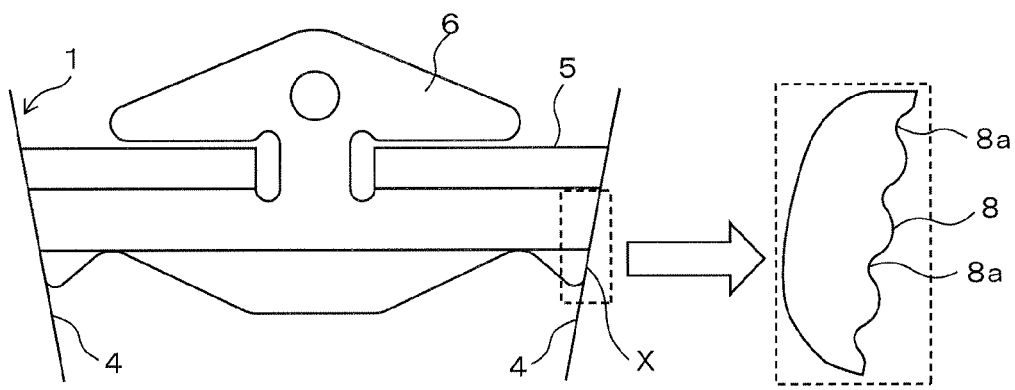
FIG. 2 is a cross sectional view taken along line II-II of FIG. 1.

FIGS. 1 and 2 illustrate a preferable example of the belt type non-stage transmission of the present invention. In these drawings, a reference numeral 1 designates a driving pulley, 2 designates a driven pulley, and a V belt 3 is wound around the driving pulley 1 and the driven pulley 2. The driving pulley 1 and the driven pulley 2 are respectively composed of a pair of discs 4, and the discs 4 are formed with a groove with V-shaped cross section. The discs 4 can get close to and apart from each other. The V belt 3 is constituted by connecting a plurality of elements 6 with a metal ring collective (belt) 5 obtained by laminating a plurality of endless metal rings. The discs 4 are made from alloy steel such as SCM steel, and the elements 6 are made of hypereutectoid carbon steel such as SKS steel. A plurality of grooves 8*a* are formed on a contacting surface X of the elements 6 with respect to the discs 4, and a diffusion layer 8 composed of a mixed structure of Fe and at least one of Zn and Sn is formed on the entire contacting surface X including the groove 8*a*. As shown in FIG. 1, the diffusion layer 8 composed of the mixed structure of Fe and at least one of Zn and Sn is formed on a center portion of each disc 4.

In this embodiment, the diffusion layer 8 is provided only to the center portion of each disc 4. Concretely, the diffusion layer 8 is provided only to a region of each disc 4 where a speed ratio (input rotating speed/output rotating speed) is 2.2 or more in the driving pulley 1 and only in a region of the disc 4 where the speed ratio is 0.7 or less in the driven pulley 2. This is because in the driving pulley 1 having a V groove, when the speed ratio is on a Low side, particularly when the speed ratio is 2.2 or more, a clamping force with respect to the elements 6 is very strong. On an OD side, when the speed ratio is 0.7 or less, an amount of frictional loss generated between the driven pulley 2 and the element 6 becomes large. By providing the diffusion layer 8 to such regions, the wear coefficient can be increased and then the clamping force can be reduced.

Figure 3:
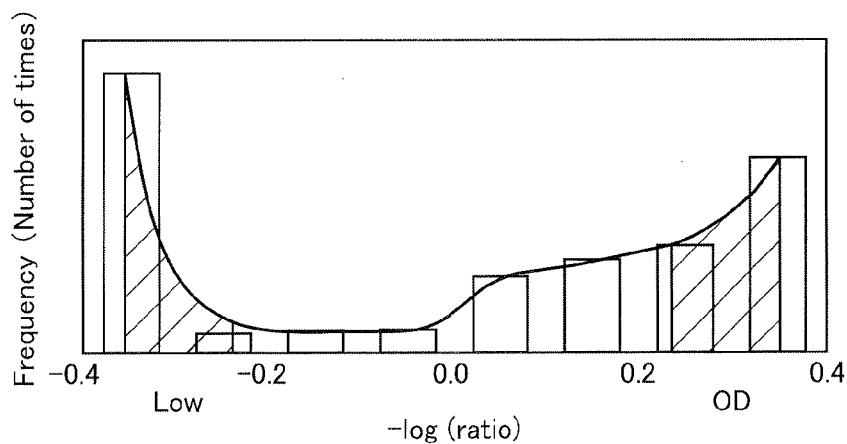
FIG. 3 is a graph illustrating a relationship between speed ratio and frequency.

Alternatively, the diffusion layer 8 can be formed only on the region of each disc 4 which frequency of use is high. FIG. 3 illustrates a relationship between logarithm of the speed ratio and the frequency of use. As shown in FIG. 3, the frequency of use is high on the Low side and the OD side shown with slanted lines in the drawing. On the Low side, the frequency of use is high in the range of −log (ratio) −0.21 to −0.37 is high, and a value obtained by expressing this as the speed ratio is 1.61 to 2.37. On the OD side, the frequency is high of use in the range of −log (ratio) 0.21 to −0.34, and a value obtained by expressing this as the speed ratio is 0.61 to 0.46. It is economical to provide the diffusion layer 8 only to such regions.

It is desirable that surface roughness of the diffusion layer 8 is Ra 0.2 to Ra 1.2, and a large frictional coefficient can be obtained in such a range. The lower limit value of the surface roughness is Ra 0.2 because a diffusion layer becomes very thin when Ra is 0.2 so that a lubrication state changes, and the surface has a roughness close to that of an untreated base material surface so that its thickness does not change. By setting hardness of the diffusion layer to Hv 700 or more, the frictional coefficient can be increased and the wear resistance can be improved. However, when the hardness exceeds Hv1100, aggression against a mating member (element 6) becomes strong so that the wear of the mating member is accelerated.

A diffusion layer which surface roughness and/or hardness change(s) is formed on an outer periphery of the diffusion layer 8. That is to say, the surface roughness and hardness of the diffusion layer 8 are higher than the material of the disc 4, but the surface roughness and hardness are lowered towards the outer periphery side of that diffusion layer. The surface roughness or the hardness matches with those of the material of the diffusion layer 8 on the outer peripheral edge. As a result, when the elements 6 move between the diffusion layer 8 and the portion outside of the diffusion layer 8, an impact is not generated, so that an excessive load can be prevented from being put on the respective members.

2. Method of Forming the Diffusion Layer

Figure 4:
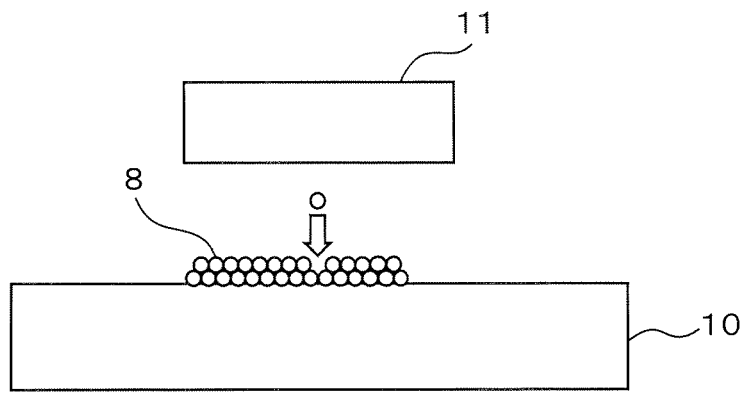
FIG. 4 is a schematic side view illustrating a discharge surface treatment device.

FIG. 4 is a side view illustrating a device which gives discharge surface treatment. A reference numeral 10 in the drawing designates the base material of the element or the disc, and 11 designates an electrode. The electrode 11 is Zn or a compound or alloy powder of Zn and another metal, Sn or a compound or alloy powder of Sn and another metal, compact obtained by compressing mixed powder of such alloy powder and dissimilar metal powder, or sintered such compact. The base material 10 and the electrode 11 are arranged so as to be countered and close to a work tank filled with petroleum-derived working fluid. The electrode 11 is used as a cathode and the base material 10 is used as an anode so that a pulse current is supplied to them. Since both of them are close nearly contact with each other, their positions are controlled not to contact with each other. When the pulse current flows between the electrode 11 and the base material 10, discharge takes place therebetween, and the electrode 11 and the base material 10 melt and evaporate due to a heat generated by the discharge. Particles of the electrode 11 which melt due to electrostatic force and airflow generated by the vaporization are carried to the surface of the base material 10 and diffuse on the melted surface of the base material 10. In this manner, the base material 10 and the particles of the electrode 11 diffuse and fuse on the surface layer of the base material 10, so that the diffusion layer 8 where at least one of Zn and Sn diffuses is formed.

Figure 5A:
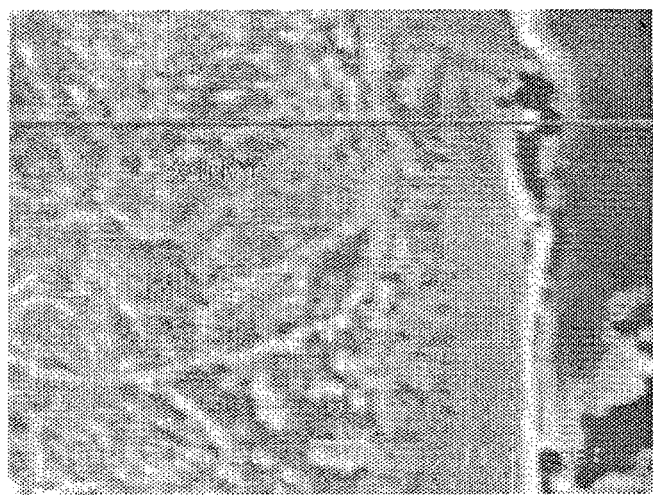
FIG. 5A is an EPMA photograph showing a cross section of a diffusion layer.
Figure 5B:
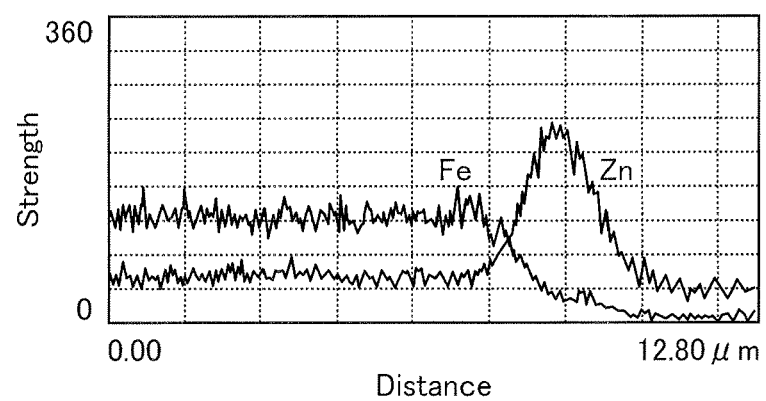
FIG. 5B is a chart showing components in the cross section.

FIG. 5A is an EPMA photograph showing a cross section of the Zn diffusion layer 8 obtained by the above described manner, and FIG. 5B shows an EPMA line analysis result showing the amount of Fe and Zn in the cross section. As shown in these drawings, the diffusion layer 8 has a thickness of about 4 μm, and the contents of Zn and Fe moderately change. The diffusion layer 8 is formed by diffusing and fusing at least one of Zn and Sn with the base material metal unlike vapor deposition or plating such as PVD or CVD for adhesion to the base material surface. For this reason, the diffusion layer 8 is not peeled from the base material 10. The belt type non-stage transmission having such a diffusion layer 8 is operated by using lubricant containing S and P so that S and P permeate through the diffusion layer 8 and the high frictional coefficient and wear resistance are given. The data in FIGS. 5A and 5B are obtained from a sample Z-1 of an example explained below.

EXAMPLES

1. Sliding Test

A square bar having 14 mm height, 17 mm width, and 70 mm length was cut out from SCM420 steel. The square bar was carburized and quenched, and then was tempered, so that a sample which hardness was adjusted to HRC 58 to 64 was formed. On the other hand, Zn or Sn powder having an average particle size of 2 μm was formed into a square plate having 2 mm height, 16 mm width, and 60 mm length to obtain an electrode. The electrode and the above sample were soaked into working fluid mainly containing coal oil supplied to the discharge surface treatment device shown in FIG. 4, and an electric current was supplied to them so that discharge was made to take place. A peak current was set within a range of 5 to 7 A, and pulse discharge was made to take place at discharge time of 0.8 to 8 μs and at a halt interval between the discharges of 2 μs. The diffusion layer in which Zn or Sn diffused on the upper surface of the sample was formed in such a manner. The resistance of the electrode was set to various values by changing compact density, so that a plurality of samples of various surface roughness, hardness and Zn or Sn content were formed. Table 1 shows the discharge condition, the surface roughness, the hardness and the Zn or Sn content rates of the respective samples. The Zn or Sn content rates were measured by using EDS (Energy-Dispersive X-ray Spectroscopy made by JEOL, type: JSM6460-LA).

TABLE 1

|  | TP Name | Frictional Coefficient | Increasing Rate of Frictional Coefficient | Wear Area [mm$^2$] | Surface Roughness Ra [μm] | Surface Roughness Rq [μm] | Element Amount [wt %] | Hardness [HV] | Treatment Condition | Electrode |
|---|---|---|---|---|---|---|---|---|---|---|
| Example | Z-1 | 0.065 | 8.8% | 1.38 | 0.878 | — | 5.94 (Zn) | 860 | Peak Current 8A, Discharge Time 8 μs | Zn |
|  | Z-2 | 0.064 | 6.5% | 1.19 | 1.072 | — | 11.68 (Zn) | 800 | ↑ | ↑ |
|  | Z-3 | 0.063 | 5.6% | 1.65 | 0.809 | — | 3.49 (Zn) | 890 | ↑ | ↑ |
|  | Z-4 | 0.063 | 4.4% | 1.47 | 1.063 | — | 7.86 (Zn) | 790 | ↑ | ↑ |
|  | Z-5 | 0.068 | 12.5% | 1.47 | 0.430 | — | 1.05 (Zn) | 905 | ↑ | ↑ |
|  | Z-6 | 0.065 | 7.6% | 1.59 | 0.560 | — | 13.25 (Zn) | 726 | ↑ | ↑ |
|  | Z-7 | 0.065 | 7.6% | 1.46 | 0.802 | — | 7.21 (Zn) | 829 | ↑ | ↑ |
|  | Z-8 | 0.062 | 2.7% | 5.36 | 1.570 | — | 34.00 (Zn) | 1151 | Peak Current 8A, Discharge Time 8 μs | ↑ |
|  | Z-9 | 0.062 | 3.3% | 5.60 | 1.324 | — | 29.00 (Zn) | 1117 | ↑ | ↑ |
|  | Z-10 | 0.056 | −6.2% | 5.36 | 2.003 | — | 17.00 (Zn) | 698 | ↑ | ↑ |
|  | Z-11 | 0.058 | −2.6% | 3.32 | 2.035 | — | 11.00 (Zn) | 646 | ↑ | ↑ |
|  | Z-12 | 0.058 | −3.2% | 2.71 | 2.058 | — | 8.00 (Zn) | 564 | ↑ | ↑ |
|  | Z-14 | 0.066 | 9.7% | 1.50 | 0.073 | — | 1.05 (Zn) | 981 | Peak Current 5A, Discharge Time 0.5 μs | ↑ |
|  | Z-15 | 0.067 | 11.7% | 0.95 | 0.113 | — | 1.60 (Zn) | 1032 | ↑ | ↑ |
|  | Z-16 | 0.067 | 11.9% | 1.36 | 0.103 | — | 2.05 (Zn) | 902 | ↑ | ↑ |
|  | ZC-17 | 0.066 | 10.6% | 2.36 | 0.268 | 0.345 | 8.04 (Zn) | 941 | Peak Current 7A, Discharge Time 0.8 μs | Zn + Cr |
|  | Z-18 | 0.067 | 12.2% | 1.28 | 0.337 | 0.464 | 12.02 (Zn) | 932 | ↑ | Zn |

TABLE 1-continued

| TP Name | Frictional Coefficient | Increasing Rate of Frictional Coefficient | Wear Area [mm²] | Surface Roughness Ra [μm] | Surface Roughness Rq [μm] | Element Amount [wt %] | Hardness [HV] | Treatment Condition | Electrode |
|---|---|---|---|---|---|---|---|---|---|
| Z-19 | 0.066 | 10.3% | 1.80 | 0.430 | 0.570 | 12.20 (Zn) | 914 | ↑ | ↑ |
| ZC-21 | 0.061 | 0.1% | 0.99 | 0.260 | 0.200 | 13.65 (Zn) | 804 | ↑ | Zn + Cr |
| Z-22 | 0.061 | 1.7% | 0.98 | 0.216 | 0.200 | 6.14 (Zn) | 961 | ↑ | Zn |
| S-1 | 0.069 | 15.0% | 1.60 | 0.370 | 0.517 | 18.45 (Sn) | 902 | ↑ | Sn |
| S-2 | 0.070 | 16.7% | 1.73 | 0.352 | 0.536 | 18.06 (Sn) | 920 | ↑ | ↑ |
| Comparative Example N-1 | 0.060 | 0.0% | 1.50 | 0.100 | 0.100 | 0.00 | 800 | — | — |

Figure 6:
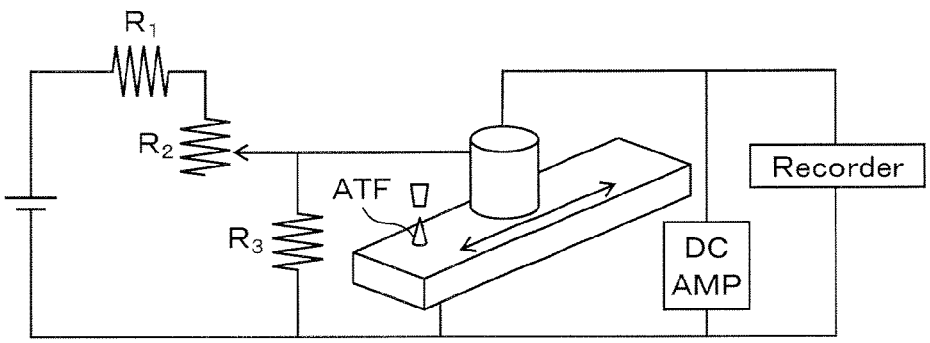
FIG. 6 is a schematic diagram illustrating a sliding test method.

On the other hand, a pin, which had a column shape with diameter of 15 mm and which lower end was a convex curve with a curve diameter of 18 mm, was cut out from SKS-95 steel. The pin was quenched and tempered, so that its hardness was adjusted to HRC 60 to 64. As shown in FIG. 6, the lower end surface of the pin was pressurized against the upper surface of the diffusion layers of the samples by a load of 5 kgf, and in the state, samples were reciprocated by 50 mm in cycle of 200 cpm. At this time, 5 cc/min of lubricant containing the components shown in Table 2 was dropped onto the upper surface of the diffusion layers. For comparison, a sliding test was conducted under the same conditions except for a condition that a sample N-1 in which the diffusion layer was not formed was used.

TABLE 2

| N | [%] | adjusting viscosity and cleaning agent | 0.10 to 0.30 |
|---|---|---|---|
| S | [%] | inhibiting wear and oxidation adjusting friction | 0.06 to 0.30 |
| P | [ppm] | inhibiting wear and oxidation adjusting friction | 100 to 600 |
| Zn | [ppm] | inhibiting wear and oxidation adjusting friction | 150 to 400 |
| Ca | [ppm] | inhibiting wear and cleaning agent | 330 to 660 |
| B | [ppm] | dispersing agent | 100 to 350 |
| Mg | [ppm] | cleaning agent | 220 to 260 |

Figure 7:
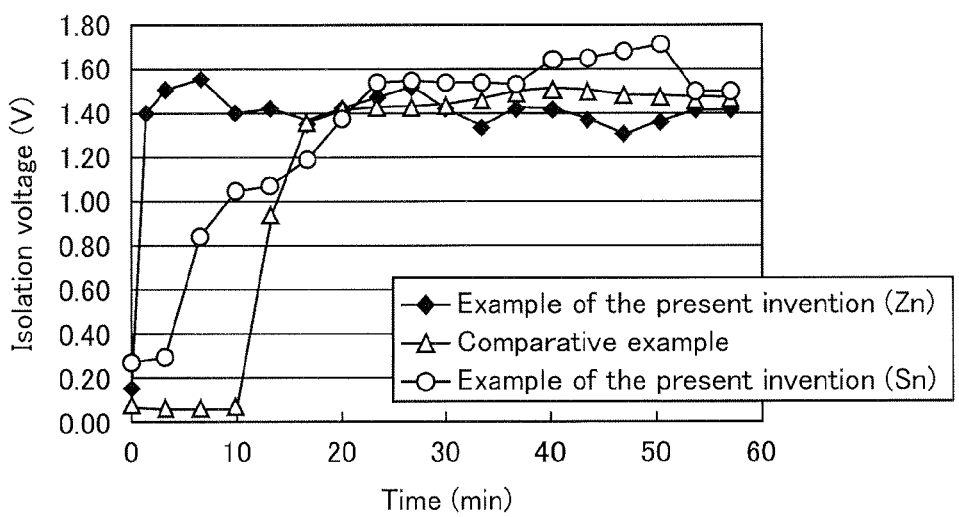
FIG. 7 is a graph illustrating a relationship between time of the sliding test and isolation voltage according to the embodiment of the present invention.

As shown in FIG. 6, an electric circuit in which the sample and the pin intervened was configured, and a low voltage of 15 mV was applied between the samples Z-1, S-1 and the pin, so that an isolation voltage during the sliding test was measured. A gain by a DC amplifier at this time was 100. The all surfaces other than the contacting surface between the sample and the pin were subject to insulating. The isolation voltage is approximately zero in a state that the sample and pin metallically contacts. However, as a coating containing S and P is formed on the contacting surface between the sample and the pin, the isolation voltage rises. FIG. 7 illustrates a relationship between the time from the starting of the sliding test and the isolation voltage. As shown in FIG. 7, in the example including Zn diffusion layer of the present invention, the isolation voltage rose nearly to the highest level in only about one minute after the starting of the sliding test. In the example including Sn diffusion layer of the invention, the isolation voltage rose in about three minutes after starting of the sliding test. This is because since the lubricant contains Ca and Mg, the permeation of S and P through the diffusion layer was accelerated. S and P in the lubricant permeate through the diffusion layer immediately after the sliding test is started, so that the coating in which S and P diffuse on the surface of the diffusion layer is formed.

On the contrary, in the sample N-1 as the comparative example which is not formed with a diffusion layer, the isolation voltage was not changed for ten minutes after starting of the sliding test. In the comparative example, therefore, sample N-1 possibly abrades away in the time. In the comparative example, the isolation voltage is equivalent to that in the example of the present invention, but the formed coating is constituted with S and P which only diffuse on Fe, and thus it is different from the coating in the examples of the present invention. The coating in the comparative example, therefore, does not have the high frictional coefficient and wear resistance unlike the examples of the present invention.

2. Relationship Between Surface Roughness and Frictional Coefficient

Figure 8:
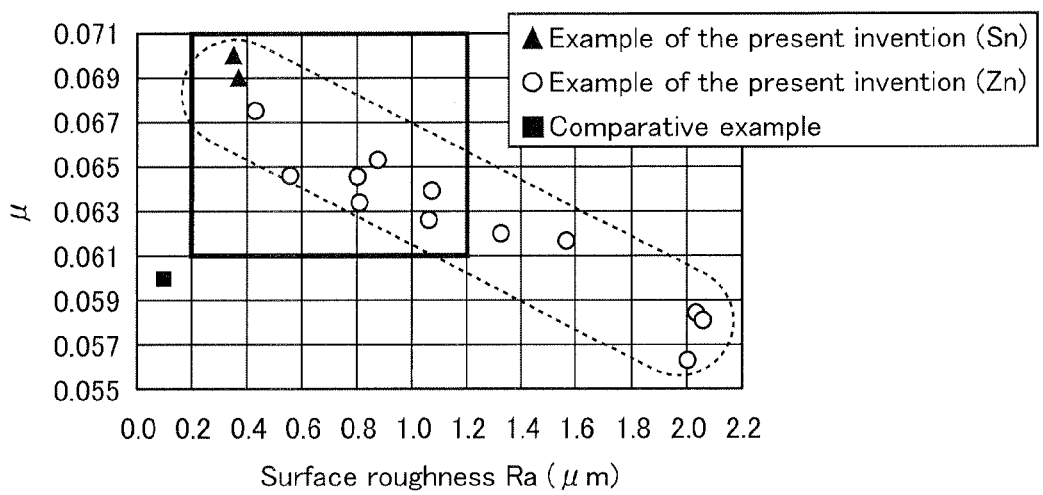
FIG. 8 is a graph illustrating a relationship between surface roughness Ra and frictional coefficient according to the embodiment of the present invention.

The frictional coefficients of the samples are also shown in Table 1. The relationship between the surface roughness and the frictional coefficient of the sliding surface of the samples after the sliding test was examined. The results are shown in FIG. 8. As shown in FIG. 8, when the surface roughness Ra was 1.2 or less, the frictional coefficient (μ) was 0.062 or more. On the other hand, in the comparative example (the sample N-1 which is the same as the comparative example shown in FIG. 7), the surface roughness Ra was 0.2 but the frictional coefficient was 0.06, which was inferior to the examples of the present invention. Fine concavities and convexities are formed on the surface of the coating, and oil reservoirs are formed on the concavities so that a lubricating action is taken. The convexities actually contact with the mating member so that a frictional force is generated. In the examples of the present invention, since the convexities are formed by the diffusion layer having high frictional coefficient, as the surface roughness Ra becomes smaller, the percentage of the convexities increases, so that the frictional coefficient increases.

Figure 9:
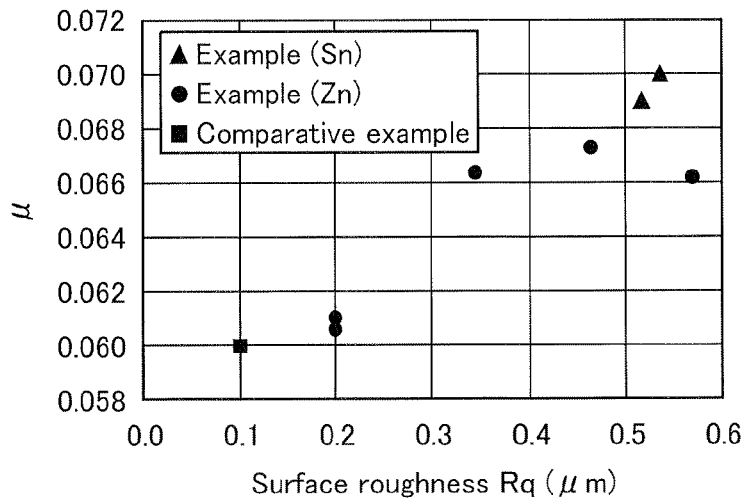
FIG. 9 is a graph illustrating a relationship between surface roughness Rq and the frictional coefficient according to the embodiment of the present invention.
Figure 10:
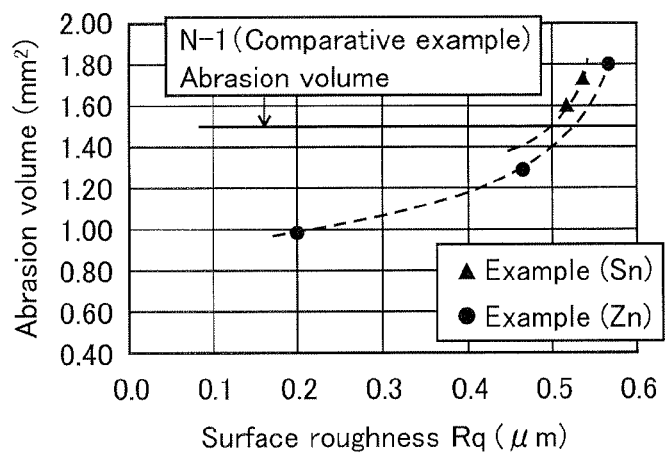
FIG. 10 is a graph illustrating a relationship between the surface roughness Rq and wear volume according to the present invention.

As shown in FIG. 9, when the surface roughness Rq is 0.2 to 0.5, the frictional coefficient is 0.062 or more. As shown in FIG. 10, when Rq exceeds 0.50, the wear volume is equivalent or larger than that of untreated materials. For this reason, the above range is suitable for obtaining the high frictional coefficient and the wear resistance.

3. Relationship Between Hardness and Frictional Coefficient

Figure 11:
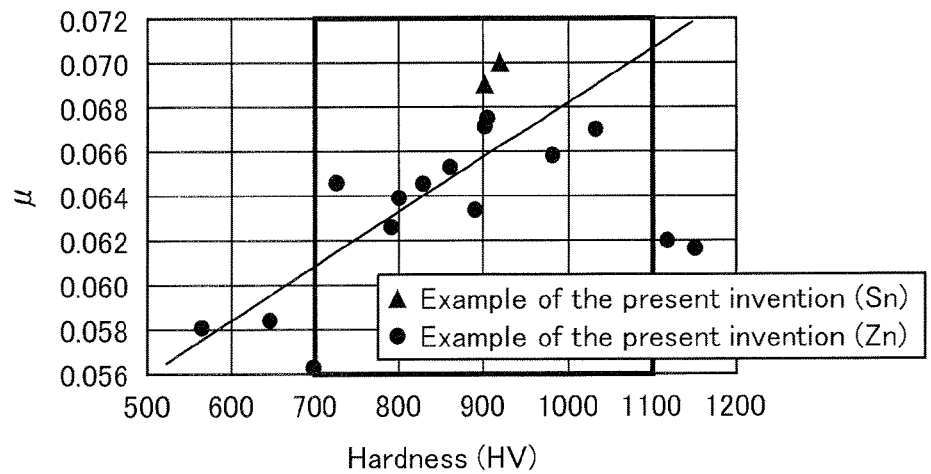
FIG. 11 is a graph illustrating a relationship between hardness and the frictional coefficient according to the embodiment of the present invention.

Relationship between the hardness and the frictional coefficient of sliding surfaces of the samples after the sliding test was examined. The results are shown in FIG. 11. As shown in FIG. 11, as the hardness becomes higher, the frictional coefficient gets larger, and when the hardness is Hv700 to Hv1100, the frictional coefficient ($\mu$) is 0.062 or more. As shown in FIG. 11, when the hardness is Hv1250, the frictional resistance is reduced because the aggression against the mating member (pin) is heightened and their wear proceeds.

4. Wear Resistance

Figure 12:
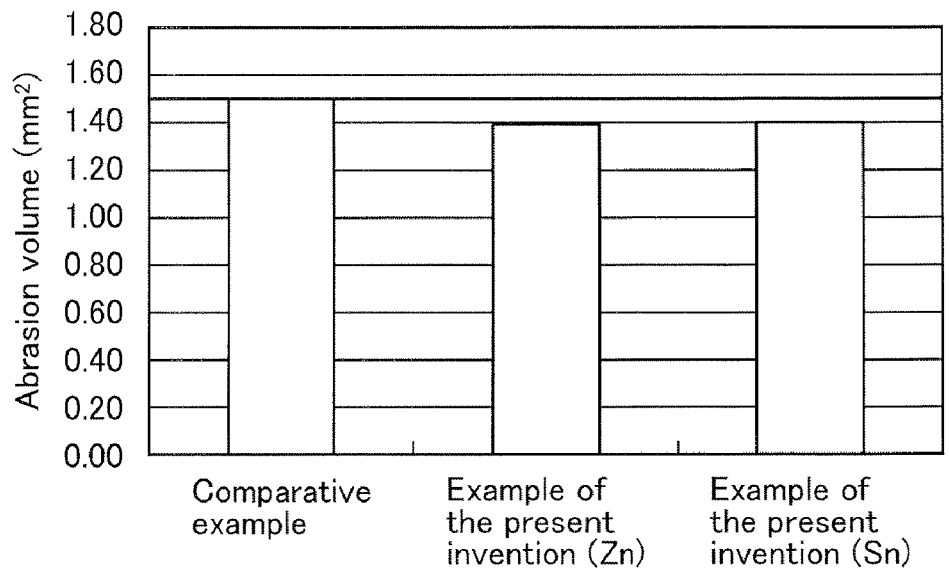
FIG. 12 is a graph illustrating a wear volume according to the embodiment of the present invention.

The sliding test was conducted on the sample in the example of the present invention, which surface roughness was Ra 0.2 to Ra 1.2 and hardness was Hv700 to Hv1100, and the sample in the comparative example which was not provided with the diffusion layer under the same condition as the above one for 60 minutes. Thereafter, a wear volume on the sliding surfaces was measured. The results are shown in FIG. 12. As shown in FIG. 12, the wear volume is smaller in the sample in the example of the present invention.

5. Contents of Zn and Sn and Frictional Coefficient

Figure 13:
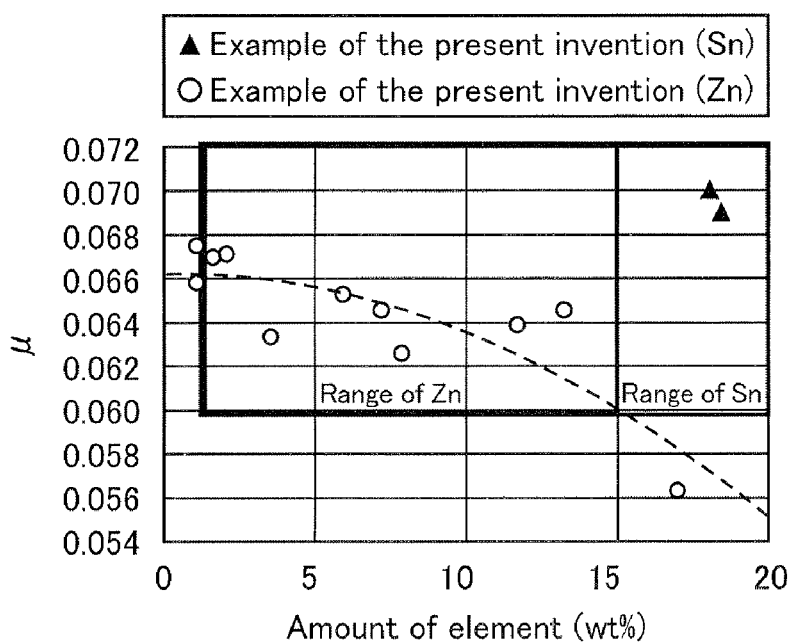
FIG. 13 is a graph illustrating a relationship between the content of Zn and the frictional coefficient according to the embodiment of the present invention.
Figure 14A:
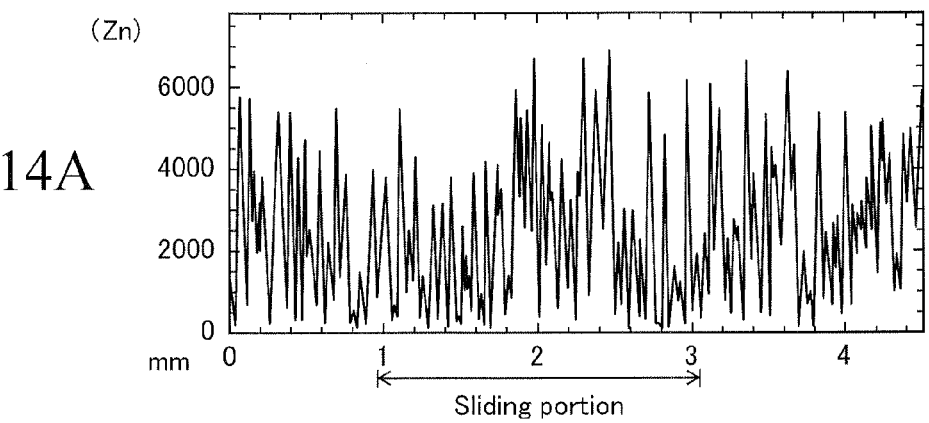
FIGS. 14A to 14D are charts illustrating components of a diffusion layer according to the embodiment of the present invention.
Figure 14B:
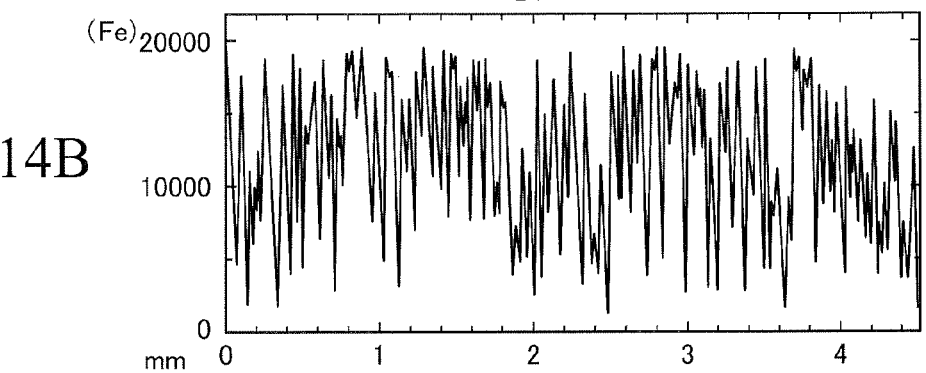
Figure 14C:
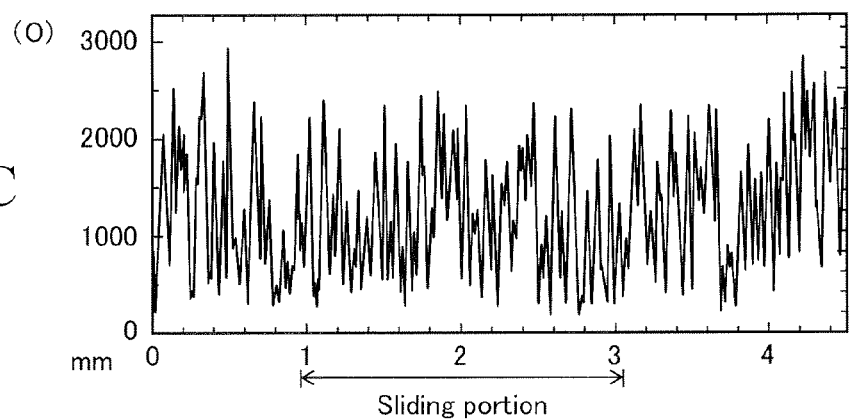
Figure 14D:
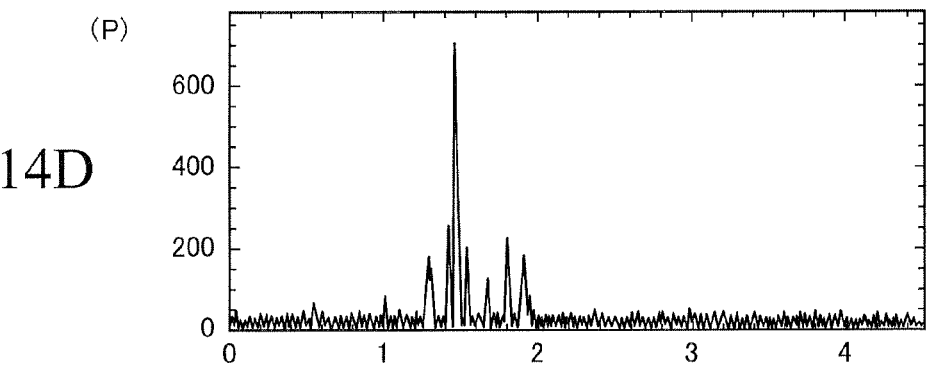

The contents of Zn and Sn in the diffusion layer and the frictional coefficient were examined. The results are shown in FIG. 13. As shown in FIG. 13, when the content of Zn is in the range of 0.5 to 15% by weight, the frictional coefficient is 0.062 or more, but when the content of Zn exceeds 15% by weight, the frictional coefficient reduces. In this case, the frictional coefficient did not reduce even if the content of Sn is 18.45% by weight.

6. Components of the Diffusion Layer

EPMA line analysis was carried out on the sample Z-7 formed with the diffusion layer subjected to the sliding test by using an EPMA line analysis device (made by JEOL, type: JOEL JXA-8100). The results are shown in FIGS. 14A to 14D. As shown in FIGS. 14A to 14D, the peaks of Zn, P and O increase on the portions where the pin slides, and the peaks reduce on a portion of Fe corresponding to the portions where the peaks of Zn, P and O increase. As a result, it was confirmed that a zinc phosphate coating was formed on the portions on which the pins slid. As is clear from FIGS. 14A to 14D, when the amount of Zn in the portion where the pin slid was compared with the amount of Zn in the portion where the pin did not slide, the peak was high on the slid portion, and thus Zn was not decreased by the sliding.

Figure 15:
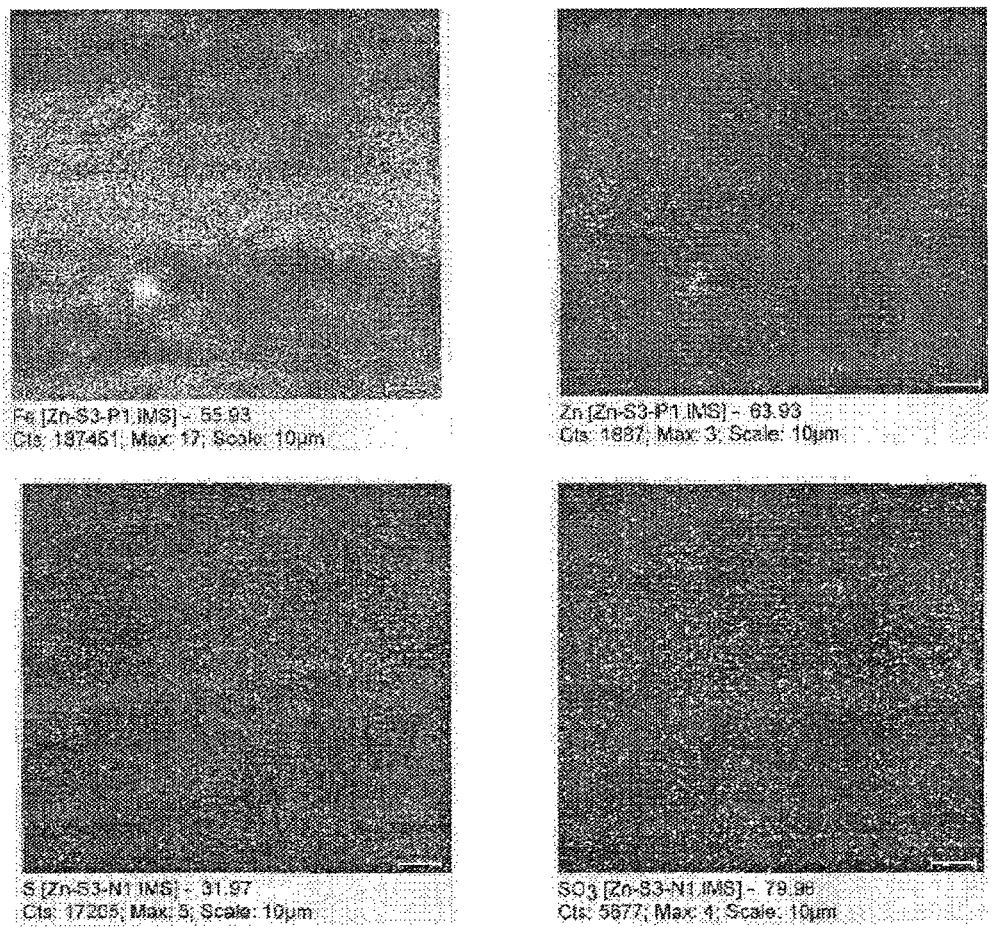
FIG. 15 is an image illustrating components of the diffusion layer according to the embodiment of the present invention.

TOF-SIMS analysis was carried out on the sample Z-16 which was formed with the diffusion layer subjected to the sliding test by an analysis device (made by ULVAC PHI, type: TRIFT-2). The results are shown in FIG. 15. The TOF-SIMS analysis is an analyzing method of emitting Ga+ ions to a sample surface and dispersing secondary ions of the element of the sample surface so as to identify the element from the dispersing time based on the mass of the secondary ions and to calculate the number of the ions. In this analyzing method, bright points with brightness according to the number of ions are generated on an image obtained by mapping the sample surface, and the amount of elements is specified by the brightness and the number of the ions. As shown in FIG. 15, distributions of Zn, S, and $SO_3$ were seen on the sliding surface, and the presence of ZnS and $ZnSO_3$ was confirmed. It was confirmed that the sample has the high frictional coefficient and wear resistance due to the presence of a mixed coating composed of the zinc phosphate, ZnS, and $ZnSO_3$.

Quantitative analysis of P, S, Ca, and Mg in the Zn coating of the sliding portion was carried out on the sample Z-1 having high frictional coefficient and wear resistance. A high-frequency inductively-coupled plasma mass spectrometry (used device: made by FI Elemental, type: Plasma Trace2) was used for the quantitative analysis of P, Ca, and Mg, and a reduction distilling device (made by JASCO corporation, type: UNIDEC-300) was used for the quantitative analysis of S. The quantitative analysis was carried out based on reduction distillation—methylene blue adsorption spectroscopy in JIS. Lubricants A and B containing the components shown in Table 3 were used for the test. 0.5 ml of nitric acid solution (purified water 9: nitride acid 1) was dropped on the sliding portion, and the Zn diffusion layer on the sliding portion was resolved for about 3 minutes, so that a contained material in the resolved solution was analyzed quantitatively. The results are shown in Table 4. As shown in Table 4, it was confirmed that generally, 0.15 to 2.0% by weight of P, 0.4 to 6.0% by weight of S, 0.15 to 0.5% by weight of Ca, and 0.1 to 0.4% by weight of Mg were present with respect to the weight of Zn in the sliding portion of the Zn diffusion layer obtained by the discharge surface treatment. It was found that the high frictional coefficient and wear resistance were obtained within a range of the contained material in the diffusion layer.

TABLE 3

The rate of respective additive components in the lubricants A and B used for the test on the sample Z-1

| | P[ppm] | S[mass %] | Ca[ppm] | Mg[ppm] |
|---|---|---|---|---|
| Lubricant A | 100 | 0.06 | 300 | 220 |
| Lubricant B | 600 | 0.30 | 660 | 260 |

TABLE 4

The weight ratio of respective elements in the Zn coating of the sample Z-1 (Zn mass ratio) [wt %]

| | P | S | Ca | Mg |
|---|---|---|---|---|
| Lubricant A | 0.17 | 0.46 | 0.15 | 0.18 |
| Lubricant B | 1.77 | 5.54 | 0.48 | 0.33 |

7. Example in Which the Diffusion Layer Contains Cr

Figure 16:
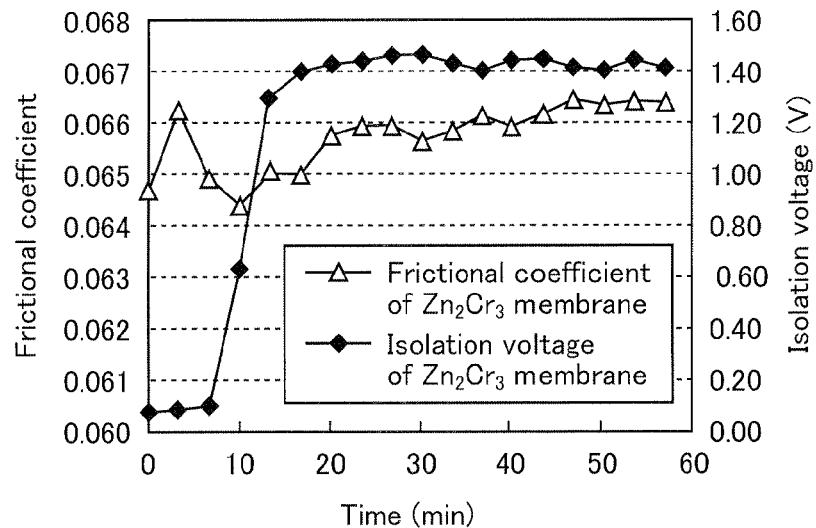
FIG. 16 is a graph illustrating a relationship between the time of the sliding test and the isolation voltage according to another embodiment of the present invention.

A compact obtained by shaping a compound of Zn and Cr was used as an electrode. Except for this, similarly to the above method, samples (ZC-17 and ZC-21) which had the diffusion layers in which Zn and $Cr_3C_2$ diffused in Fe were formed. The sliding test was conducted on these samples under the same condition as the above. The results are shown in FIG. 16. As is clear from FIG. 16, the high frictional coefficient of about 0.066 could be obtained by forming the diffusion layers composed of Zn and $Cr_3C_2$.

8. Example in Which the Lubricant Does Not Contain Ca and Mg

Figure 17:
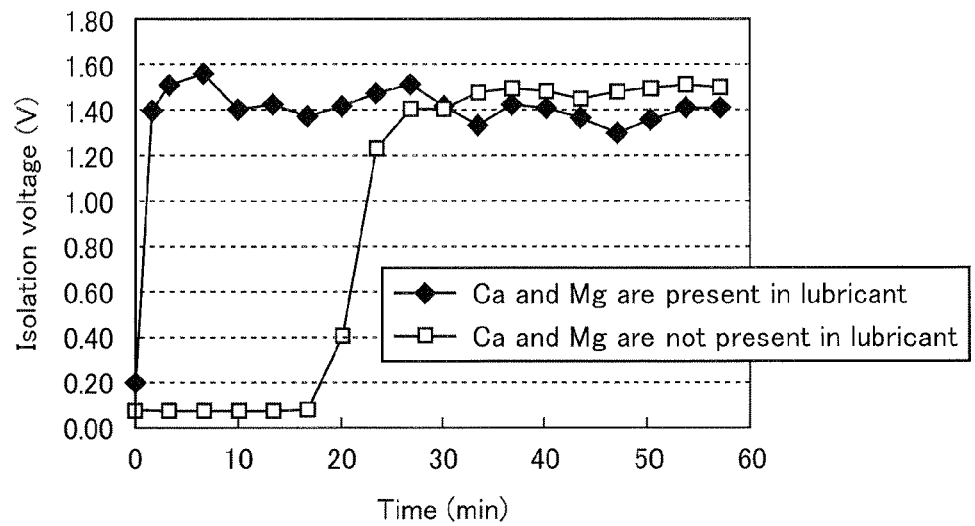
FIG. 17 is a graph illustrating a relationship between the time of the sliding test and the isolation voltage according to another embodiment of the present invention.

The sliding test was conducted using sample Z-1 and the lubricant containing only S and P under the same condition as the above. The results are shown in FIG. 17. For comparison, the sliding test was conducted using a lubricant containing Ca, Mg, and the like. The results (plots in FIG. 7) are shown in FIG. 17. As shown in FIG. 17, it was confirmed that the permeation of S and P through the diffusion layer and the formation of a coating take time when the lubricant does not contain Ca, Mg, and the like.

9. Actual Machine Test

Figure 18A:
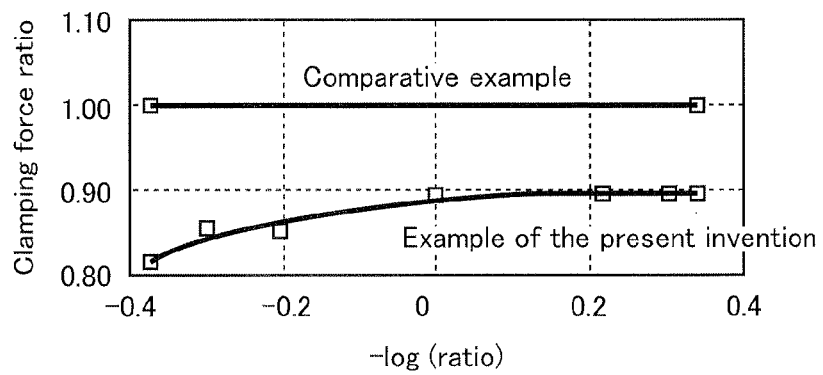
FIG. 18A is a graph illustrating a relationship between speed ratio and clamping force ratio according to another embodiment of the present invention.
Figure 18B:
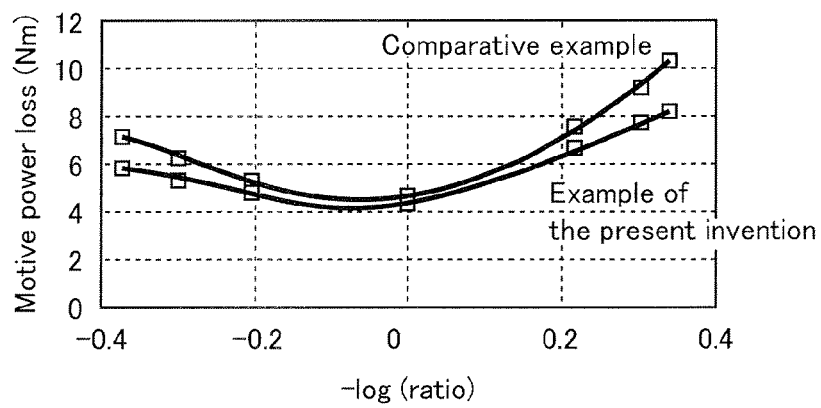
FIG. 18B is a graph illustrating a relationship between the speed ratio and motive power loss.

The belt type non-stage transmission shown in FIGS. 1 and 2 was manufactured, and the lubricant containing the components shown in Table 2 was used to operate the device. A clamping force ratio and a motive power loss at that time were measured. In this case, a diffusion layer which was the same as that of the sample Z-1 was formed on the surfaces of the pulleys. The clamping force ratio is a ratio of the clamping force of the belt type non-stage transmission of the present invention to the clamping force in the belt-type non-stage transmission using the pulley without the diffusion layer which is defined as 1. The clamping force ratio and the motive power loss with respect to the speed ratio (−log (ratio)) are shown in FIGS. 18A and 18B.

The clamping force becomes very strong on the Low side when the speed ratio is 2.2 or more, and thus stepped wear occasionally occurs on the surface of the pulley. However, as shown in FIG. 18A, in the belt type non-stage transmission of the present invention, since the high frictional coefficient is obtained by the diffusion layer, the clamping force particularly on the Low side is reduced greatly. As shown in FIG. 18B, in the belt type non-stage transmission of the present invention, the motive power loss on the Low side and the OD side is reduced. Concretely, the speed ratio is in the rage of 0.65 or less and the range of 2.0 or more.

In the above examples, the diffusion layer is provided only to the pulleys, but when it is provided only to the elements or both of them, the same function and effect can be obtained. When the diffusion layer is provided to the elements, the fine grooves for retaining the lubricant can be formed by machine work after the diffusion layer is formed. The method of permeating S and P through the diffusion layer is not limited to the method in which the operation is performed by the actual machine, and for example, an arbitrary method such that the elements soaked in the lubricant are rubbed with each other may be adopted.

The invention claimed is:

1. A belt type non-stage transmission comprising:
   a pair of pulleys having a groove with V-shaped cross section, the groove being able to change a width thereof;
   a V belt manufactured by connecting a plurality of elements via a belt and wound around the pair of pulleys; and
   a diffusion layer formed on at least one of contacting surfaces between the pulley and the element;
   wherein the diffusion layer is formed by diffusing at least one of Zn and Sn into a surface layer of a metallic material of at least one of the pulley and the element, and contains S and P;
   wherein a content of Zn and Sn in the diffusion layer is 0.5 to 15% by weight, and 0.5 to 18.5% by weight, respectively.

2. The belt type non-stage transmission according to claim 1, wherein a plurality of grooves for retaining lubricant is provided onto the contacting surfaces between the element and the pulley,
   the diffusion layer in which at least one of Zn and Sn diffuses is provided to the grooves and the surface layer of the metallic material of the contacting surfaces, and the diffusion layer contains S and P.

3. The belt type non-stage transmission according to claim 1, wherein content of S is 0.4 to 6.0% by weight and content of P is 0.15 to 2.0% by weight.

4. The belt type non-stage transmission according to claim 1, wherein the diffusion layer contains at least one of 0.15 to 0.5% by weight of Ca and 0.1 to 0.4% by weight of Mg.

5. The belt type non-stage transmission according to claim 1, wherein the diffusion layer has a thickness of 1 to 50 μm.

6. The belt type non-stage transmission according to claim 1, wherein the diffusion layer contains 1 to 20% by weight as total amount of at least one of Ni, Cr, Mo, Al and C.

7. The belt type non-stage transmission according to claim 1, wherein the pulleys are composed of a driving pulley and a driven pulley,
   the diffusion layer is provided only to a region of which speed ratio is 2.2 or more in the grooves of the driving pulley, and
   the diffusion layer is provided only to a region of which speed ratio is 0.7 or less in the grooves of the driven pulley.

8. The belt type non-stage transmission according to claim 1, wherein the diffusion layer has surface roughness of Ra 0.2 to Ra 1.2 and Rq 0.2 to Rq 0.5.

9. The belt type non-stage transmission according to claim 1, wherein the diffusion layer has a hardness of Hv 700 to Hv 1100.

10. The belt type non-stage transmission according to claim 1, wherein an additional diffusion layer is provided to an outer periphery of the diffusion layer,
    the additional diffusion layer has a surface roughness and a hardness which change towards the outer periphery side, so that the surface roughness and the hardness on an outer peripheral edge of the additional diffusion layer are identical to those of the metallic material.

11. A method for operating a belt type non-stage transmission comprising:
- a pair of pulleys having a groove with V-shaped cross section, the groove being able to change a width thereof; and
- a V belt manufactured by connecting a plurality of elements via a belt and wound around the pair of pulleys;
- the method comprising:
  - forming a diffusion layer on at least one of contacting surfaces between the pulley and the element, the diffusion layer being formed by diffusing Zn into a surface layer of a metallic material of at least one of the pulley and the element; and
  - operating the belt type non-stage transmission while contacting a lubricant containing 0.06 to 0.30% by weight of S and 100 to 600 ppm of P;
- wherein a content of Zn in the diffusion layer is 0.5 to 15% by weight.

* * * * *